Patented Feb. 10, 1942

2,272,272

UNITED STATES PATENT OFFICE 2,272,272

PROCESS FOR PREPARING HYDROXY NAPHTHALENE COMPOUNDS

Harold G. Mow, Buffalo, N. Y., assignor to Allied Chemical & Dye Corporation, a corporation of New York No Drawing. Application September 2, 1939, Serial No. 293,201

8 Claims. (Cl. 260—512)

This invention relates to hydrolysis of naphthalene sulfonates to produce naphthol derivatives.

More particularly the invention is concerned with improvements in the hydrolysis of naphthalene sulfonates containing, in addition to the sulfonate group to be hydrolyzed, one or more hydrolyzable groups, for example amino groups or additional sulfonate groups. The naphthol products are of the type which are non-volatile with steam.

In the past it has been the practice to prepare naphthols of the type non-volatile with steam by hydrolyzing the corresponding naphthalene sulfonates. Hydrolysis was accomplished by heating a liquid mass comprising the sulfonate, caustic alkali, and water. Although the proportions of water and caustic alkali required to produce this liquid mass varied depending upon the particular sulfonate in question, it was considered essential to maintain the liquidity of the mass in order to avoid destruction of the organic material during the hydrolysis. To maintain fluidity of the mass substantial quantities of water were provided. In the case of sulfonates containing, in addition to the sulfonate group to be hydrolyzed, another or a plurality of other hydrolyzable groups, the water present had the disadvantage that it tended to promote secondary hydrolytic reactions and thus to supplant these other hydrolyzable groups by hydroxyl, forming by-products which the manufacturer neither required nor desired and complicating recovery and purification of the desired product. In addition the process required considerable heat to raise the temperature of the mass and a goodly proportion of the required heat served the sole function of raising the temperature of this water. Moreover, this water always occupied an appreciable part of the available volume in the apparatus used for the hydrolysis, and thereby prevented the use of said apparatus to its maximum capacity.

In accordance with the present invention I have found that the disadvantages of the prior art hydrolytic methods for the preparation of naphthols not volatile with steam from naphthalene sulfonates containing one or more other hydrolyzable groups may be largely, or substantially completely, avoided by conducting the hydrolysis with the reaction mass essentially in the form of a dough and simultaneously subjecting the dough to the combined kneading and impacting action of loose, massive, tumbling agitators.

By my method I am able to obtain high yields of the desired products of hydrolysis while at the same time I employ less water, less caustic alkali, and correspondingly less acid for subsequent neutralization than are employed in the usual prior art methods. Thereby I increase the productive capacity of the apparatus, reduce raw material and heat requirements, and eliminate a substantial proportion of the expense of handling materials.

A particularly notable advantage of my process is its ability to effect limited, partial hydrolysis without formation of products of more extensive hydrolysis.

The hydrolysis of the invention may be conducted at temperatures between about 170° and 250° C. under mildly elevated pressure on the order of 3 to 7 atmospheres absolute with the exclusion of oxygen.

I have found that in the case of sodium and potassium hydroxides most effective and economical operation is obtained when the ratio, mols hydroxide : mols sulfonate $x$ No. of sulfonate groups per mol sulfonate, which for convenience I have designated the "H/S" ratio, is between the limits 1.2 and 2.0.

The proportion of water present is subject to variation, depending upon the identity of the sulfonate and upon the ratio of alkali to sulfonate. However, it should be sufficient to form a doughy mass of the initial materials upon heating them to the temperature of hydrolysis. The consistency of the mass at the temperature of hydrolysis is that of cake dough. The optimum consistency is approximately the consistency of a mass obtained by mixing one part of 1-naphthylamine-3,6,8-trisodium-trisulfonate, 0.41 part of NaOH, and 1.25 parts of water and heating to 200° C., or by mixing 100 parts of 2-naphthylamine-6,8-disodium-disulfonate with 35 parts of NaOH and 10 parts of water and heating the mixture to about 220° C. By both of these procedures a product is obtained having the dough-like consistency which is an essential characteristic of the reaction mass treated in accordance with the present process.

A suitable apparatus for carrying out the process of the present invention comprises a rotary drum containing massive, loose, tumbling agitators, for example, the ball mill apparatus of United States Patent No. 1,862,557 issued to Adolph Wendler and assigned to National Aniline & Chemical Company, Inc. The loose, tumbling agitators may be massive balls, bars, angular members, or irregularly shaped elements. By "massive" agitators I mean elements heavy enough so that they will not adhere fixedly to the dough-like reaction mass but during rotation will render and tear themselves free and drop with positive impact against and into freshly exposed portions of the mass, thus subjecting it to a kneading action. The apparatus may be made of carbon steel or of the corrosion resistant alloys.

The invention is particularly applicable to the preparation of H-acid from 1-naphthylamine-3,6,8-trisodium-trisulfonate, the preparation of gamma-acid from 2-naphthylamine-6,8-disodiumdisulfonate, the preparation of I-acid from 2-naphthylamine-5-7-disodium-disulfonate, the preparation of S-acid from 1-naphthylamine-4,8-disulfonic acid, the preparation of chromotropeacid from 1-naphthol-3,6,8-trisulfonic acid, the preparation of 2S-acid from 1,8,2,4-naphthalene sultam-disulfonic acid, and the preparation of 2R-acid from 2-amino-3,6,8-trisodium-trisulfonate.

I have found that with the sulfonates or sulfonic acids noted above, a weight of water varying between three-sevenths and one-ninth the weight of NaOH employed usually provides the doughy consistency which I desire to obtain. Assuming that all of the sulfonic acid groups are neutralized previously and therefore no caustic soda is used up in this neutralization and no water is generated, these quantities correspond to the use of an aqueous NaOH solution having a concentration between 70% and 90%. It should be appreciated that where ratios of NaOH to sulfonate have been given above, these ratios assume the sulfonate to be present in the form of an alkali metal salt. If free sulfonic acid groups are present, then the quantity of NaOH consumed in forming the sodium sulfonate and the quantity of water thus generated should be taken into consideration in calculating the caustic and water present.

The following specific examples further illustrate the nature of my invention. In the examples quantities are expressed as parts by weight.

Example 2.—*Preparation of H-acid*

A cylindrical iron drum containing freely movable, massive tumbling agitators and adapted to be heated and to be rotated on a horizontal axis and having a pressure control valve adapted to vent steam in excess of 50 pounds per square inch gage was charged with a mixture containing 1000 parts of the trisodium salt of 1-amino-3,6,8-naphthalene trisulfonic acid, 410 parts of caustic soda, and 1250 parts of water. An H/S ratio of approximately 1.5 was thus provided. The drum was closed, set in motion, heated to about 200° C., and maintained at that temperature under autogenous pressure for about three hours, when the desired hydrolytic reaction was complete according to the usual tests. The mass was then cooled, diluted with about 100 parts water to make it sufficiently fluid to discharge, and was transferred to another vessel. It was then further diluted and made acid to precipitate the monosodium salt of 1-amino-8-hydroxy-3,6-naphthalene disulfonic acid, more commonly known as H-acid. The latter was isolated by filtration and washed with water to remove mother liquor. A product of high purity was thus obtained in a yield equal to about 80% of theoretical.

Example 2.—*Preparation of gamma-acid*

Into a cylindrical drum, fitted as described in Example 1, was charged a mixture consisting of 100 parts 2-naphthylamine-6,8-disodium-disulfonate (amino G-salt, M. W. 347) in powder form, and 70 parts of a 50% aqueous solution of caustic soda, providing an H/S ratio of about 1.5. The drum was heated and rotated to thoroughly agitate the mixture. Heating and agitation were continued at atmospheric pressure until sufficient water was evaporated off from the mixture to bring the ratio of caustic soda to residual water to 3.5:1. During the early part of this evaporation air was expelled by the steam generated so that before the evaporation was completed the drum contained an atmosphere of steam substantially devoid of oxygen. The drum gas vent was then closed, rotation being continued, and the agitated mixture was heated to 220° C. ($\pm 5°$ C.) and maintained at this temperature and the autogenous pressure for about six hours. Then the reaction mass was cooled to around 120° C. and diluted with about 10 parts of water. The aqueous mixture was stirred for about half an hour to assure solution of the reaction mass and the solution was transferred to a suitable tank in which it was made acid to Congo Red with hydrochloric acid, and filtered. The precipitated 2,8,6 - amino - naphthol - sulfonic acid (gamma-acid) was separated as a filter cake, washed with cold water to remove inorganic salts and mineral acid, and blown or sucked as dry as possible before it was removed from the filter. The yield of gamma-acid was 84% of theoretical.

Example 3.—*Preparation of I-acid*

100 parts of 2-amino-naphthalene-5,7-disodium-disulfonate (amino I-salt of M. W. 347) and an aqueous concentrated caustic soda solution containing 32 parts of NaOH, providing an H/S ratio of about 1.4, were mixed and evaporated in a rotating mill until the NaOH : H₂O ratio was 4:1. Oxygen was thus expelled as in Example 2. The mass was then heated under autogenous pressure in the mill as in Example 1 for five hours at 210° C. ($\pm 5°$ C.). The mixture was cooled, diluted with water, blown to a neutralization tank, and made acid to Congo Red with sulfuric acid. The precipitated 2,5,7-amino-naphthol-sulfonic acid (I-acid, M. W. 239) was separated as a cake by filtration. The cake was washed and blown or sucked as dry as possible in the usual manner. The yield of I-acid (M. W. 239) was 85% of theoretical.

Example 4.—*Preparation of S-acid*

100 parts 1-naphthylamine-4,8-disulfonic acid in paste form were mixed in a rotating drum of the type described in Example 1 with just sufficient aqueous caustic soda to make the charge neutral or very slightly alkaline to Brilliant Yellow; then the mass was mixed with concentrated aqueous caustic soda solution containing 45 parts of NaOH, yielding an H/S ratio of approximately 1.7. The mixture was heated and the drum rotated to agitate the mixture until sufficient water was removed by evaporation to provide an NaOH : H₂O ratio of 4 : 1 and exhaust air. The mill was then sealed and the mixture, with continued rotation and consequent agitation, was heated at 220° C. ($\pm 5°$ C.) and the developed pressure for about eight hours.

The mass was then cooled, diluted with water, and blown into aqueous mineral acid to render the mass acid to Congo Red. The precipitated 1,8,4 - amino - naphthol - sulfonic acid (M. W.

239) was separated as a cake by filtration. The yield was 78% of theoretical.

EXAMPLE 5.—*Preparation of chromotrope acid*

721 parts of the disodium salt of 1-naphthylamine-3,6,8-trisulfonic acid (M. W. 427) were mixed with about 7600 parts water. To this solution 180 parts of 50° Bé. sulfuric acid were added, and the mixture was diluted with about 1500 to 2000 parts of water. The mixture was cooled to about 28° C. and 125 parts commercial sodium nitrite were added thereto. The mixture was agitated for three hours; thereafter a slight excess of nitrous acid was detectable in the mixture. The aqueous mass was boiled until the diazonium salt therein was decomposed (as determined by the usual spotting test with a sample of the boiled liquid and an alkaline solution of a coupling component, R-salt). The solution was then made faintly alkaline to Brilliant Yellow by addition of about 150 parts soda ash. To the neutral solution of 1-naphthol-3,6,8-trisodium-trisulfonate, an aqueous concentrated caustic soda solution containing 70 parts NaOH was added and the mixture was evaporated until the solution or slurry had a gravity of about 42° Bé. The mixture was cooled to 70° to 75° C.; to it aqueous concentrated caustic soda containing 273 parts NaOH was added, and the alkaline mass of H/S ratio approximately 1.6 was evaporated in a rotary ball mill, until the ratio of caustic soda to water was about 5.3:1. The mill was then sealed off and the charge was heated at the developed pressure at a temperature of 200° C. ($\pm$5° C.) for about five hours. The reaction mass was cooled and diluted with water. The resulting solution was transferred to a suitable vessel and was immediately made acid to Congo Red with mineral acid. The aqueous solution was cooled to 25° to 30° C. and diluted to a volume corresponding to about 6100 parts water. The precipitated monosodium salt of 1,8-dihydroxy-naphthalene-3,6-disulfonic acid or chromotrope acid (M. W. 342) was separated as a cake by filtration in the usual manner.

The yield of chromotrope acid was 82½% of theoretical.

In the above examples it is not essential that the preliminary evaporation be carried out in the rotary mill but this procedure has the advantages that it avoids transferring the hot doughy mass from one vessel to another and assists in expelling air from the hydrolysis chamber.

I claim:

1. In the alkaline partial hydrolysis of a naphthalene sulfonate containing at least one hydrolyzable group in addition to the sulfonate group to be hydrolyzed, the improvement which comprises forming a mixture of the naphthalene sulfonate and caustic soda is an H/S ratio between 1.2 and 2.0 with sufficient water to provide a mass having the consistency of dough at a hydrolysis temperature between 170° and 250° C., heating the mass at the hydrolysis temperature, and simultaneously subjecting it to the kneading-impacting action of loose, massive, tumbling agitators.

2. In the alkaline partial hydrolysis of a naphthalene sulfonate containing at least one hydrolyzed group in addition to the sulfonate group to be hydrolyzed, the improvement which comprises forming a mixture of the naphthalene sulfonate and caustic soda and water in an H/S ratio between 1.2 and 2.0 and an $H_2O:NaOH$ ratio between 3:7 and 1:9 to provide a mass having the consistency of dough at hydrolysis temperature, heating the mass at hydrolysis temperature, and simultaneously subjecting it to the kneading-impacting action of loose, massive, tumbling agitators.

3. In the alkaline partial hydrolysis of a naphthalene sulfonate containing at least one hydrolyzable group in addition to the sulfonate group to be hydrolyzed, the improvement which comprises forming a mixture of the naphthalene sulfonate and aqueous 70% to 90% caustic soda in an H/S ratio between 1.2 and 2.0 to provide a mass having the consistency of dough at a hydrolysis temperature between 170° and 250° C., heating the mass at the hydrolysis temperature, and simultaneously subjecting it to the kneading-impacting action of loose, massive, tumbling agitators.

4. In the alkaline hydrolysis of 1-amino-naphthalene-3,6,8-trisodium-trisulfonate to form the 1-amino-8-naphthol-3,6-disodium-disulfonate, the improvement which comprises forming a mixture of the 1-amino-naphthalene-3,6,8-trisodium-trisulfonate and caustic soda and water in an H/S ratio between 1.2 and 2.0, and an $H_2O/NaOH$ ratio of about 3/1 so as to provide a mass having the consistency of dough at a hydrolysis temperature between 170° and 250° C., heating the mass at said hydrolysis temperature, and simultaneously subjecting it to the kneading-impacting action of loose, massive, tumbling agitators.

5. In the alkaline hydrolysis of an unsubstituted naphthylamine-disodium-disulfonate to form the corresponding amino-naphthol-monosulfonate, the improvement which comprises forming a mixture of the naphthylamine-disulfonate and caustic soda and water in an H/S ratio between 1.2 and 2.0 and an $H_2O/NaOH$ ratio between 3/7 and 1/9 so as to provide a mass having the consistency of dough at a hydrolysis temperature between 170° and 250° C., heating the mass at said hydrolysis temperature, and simultaneously subjecting it to the kneading-impacting action of loose, massive, tumbling agitators.

6. In the alkaline hydrolysis of an unsubstituted naphthol-trisodium-trisulfonate to form the corresponding dihydroxy-naphthalene-disodium-disulfonate, the improvement which comprises forming a mixture of the naphthol-trisodium-trisulfonate and caustic soda and water in an H/S ratio between 1.2 and 2.0 and an $H_2O/NaOH$ ratio between 3/7 and 1/9 so as to provide a mass having the consistency of dough at a hydrolysis temperature between 170° and 250° C., heating the mass at said hydrolysis temperature, and simultaneously subjecting it to the kneading-impacting action of loose, massive, tumbling agitators.

7. In the alkaline hydrolysis of an unsubstituted naphthylamine-disodium-disulfonate to form the corresponding amino-naphthol-monosulfonate, the improvement which comprises forming a mixture of the naphthylamine-disulfonate and caustic soda and water in an H/S ratio between 1.2 and 2.0 and an $H_2O/NaOH$ ratio substantially above 3/7 in a rotary drum containing loose, massive, tumbling agitators, heating said mixture to expel water therefrom and drive out air from said drum, continuing such heating until the $H_2O/NaOH$ ratio of the mixture has been reduced to a ratio between 3/7 and 1/9 so as to provide a mass having the consistency of dough at a hydrolysis temperature between 170° and 250° C., heating the mass at said hydrolysis temperature, and simultaneously subjecting it to the kneading-impacting action of said loose, massive, tumbling agitators.

8. In the alkaline hydrolysis of an unsubstituted naphthol-trisodium-trisulfonate to form the corresponding dihydroxy-naphthalene-disodium-disulfonate, the improvement which comprises forming a mixture of the naphthol-trisodium-trisulfonate and caustic soda and water in an H/S ratio between 1.2 and 2.0 and an $H_2O/NaOH$ ratio substantially above 3/7 in a rotary drum containing loose, massive, tumbling agitators, heating said mixture to expel water therefrom and drive out air from said drum, continuing such heating until the $H_2O/NaOH$ ratio of the mixture has been reduced to a ratio between 3/7 and 1/9 so as to provide a mass having the consistency of dough at a hydrolysis temperature between 170° and 250° C., heating the mass at said hydrolysis temperature, and simultaneously subjecting it to the kneading-impacting action of said loose, massive, tumbling agitators.

HAROLD G. MOW.